US007764404B2

(12) United States Patent
Fukada et al.

(10) Patent No.: US 7,764,404 B2
(45) Date of Patent: Jul. 27, 2010

(54) INFORMATION PROCESSING APPARATUS AND CONTROL METHOD THEREOF

(75) Inventors: Shinichi Fukada, Kawasaki (JP); Yoichi Takaragi, Yokohama (JP); Hideaki Kurihara, Tokyo (JP); Tatsuo Shinagawa, Yokohama (JP); Hiroyuki Kimura, Kawasaki (JP); Kunio Yoshihara, Hachioji (JP); Tsutomu Murayama, Yokohama (JP)

(73) Assignee: Canon Kabushiki Kaisha (JP)

( * ) Notice: Subject to any disclaimer, the term of this patent is extended or adjusted under 35 U.S.C. 154(b) by 408 days.

(21) Appl. No.: 11/953,512

(22) Filed: Dec. 10, 2007

(65) Prior Publication Data

US 2008/0144117 A1 Jun. 19, 2008

(30) Foreign Application Priority Data

Dec. 13, 2006 (JP) ............................. 2006-336378

(51) Int. Cl.
*G06K 15/00* (2006.01)

(52) U.S. Cl. ...................... 358/3.28; 358/1.1; 358/1.16; 358/464

(58) Field of Classification Search .................. 358/1.1, 358/1.9, 3.28, 1.16, 400, 401, 403, 464
See application file for complete search history.

(56) References Cited

U.S. PATENT DOCUMENTS 7,130,086 B2 * 10/2006 Ohara ....................... 358/3.28
2006/0168514 A1 7/2006 Tokunaga

FOREIGN PATENT DOCUMENTS

| | | |
|---|---|---|
| JP | 2003-051932 A | 2/2003 |
| JP | 2003-99673 A | 4/2003 |
| JP | 2006-211003 A | 8/2006 |
| JP | 2006-211248 A | 8/2006 |
| JP | 2006-270589 A | 10/2006 |

* cited by examiner

*Primary Examiner*—Thomas D Lee
(74) *Attorney, Agent, or Firm*—Rossi, Kimms & McDowell LLP

(57) ABSTRACT

When an image including a specific image is created and stored, it is determined whether or not the height/width ratio of the specific image has been changed by a user in the image that includes the specific image. Whether or not to store the image including the specific image is controlled based on the results of the determination.

4 Claims, 10 Drawing Sheets

START
S601 STORE OR COPY IMAGE? — NO / YES
S602 DETERMINE COLOR DIFFERENCE BETWEEN TRADEMARK IMAGE COLOR AND BACKGROUND COLOR
S603 COLOR DIFFERENCE GREATER THAN OR EQUAL TO STANDARD? — NO / YES
S604 DETERMINE HEIGHT/WIDTH RATIO OF TRADEMARK IMAGE
S605 HEIGHT/WIDTH RATIO CHANGED? — YES / NO
S606 STORE OR COPY IMAGE USING TRADEMARK IMAGE
S607 RECORD USE OF TRADEMARK IMAGE AS UTILIZATION LOG
S608 UPDATE DISTRIBUTION LOG OF TRADEMARK IMAGE
S609 WARN USER OF NON-COMPLIANCE WITH UTILIZATION POLICY
S610 RECORD AS UTILIZATION NON-COMPLIANCE LOG
S611 TERMINATE STORAGE OR COPYING
END

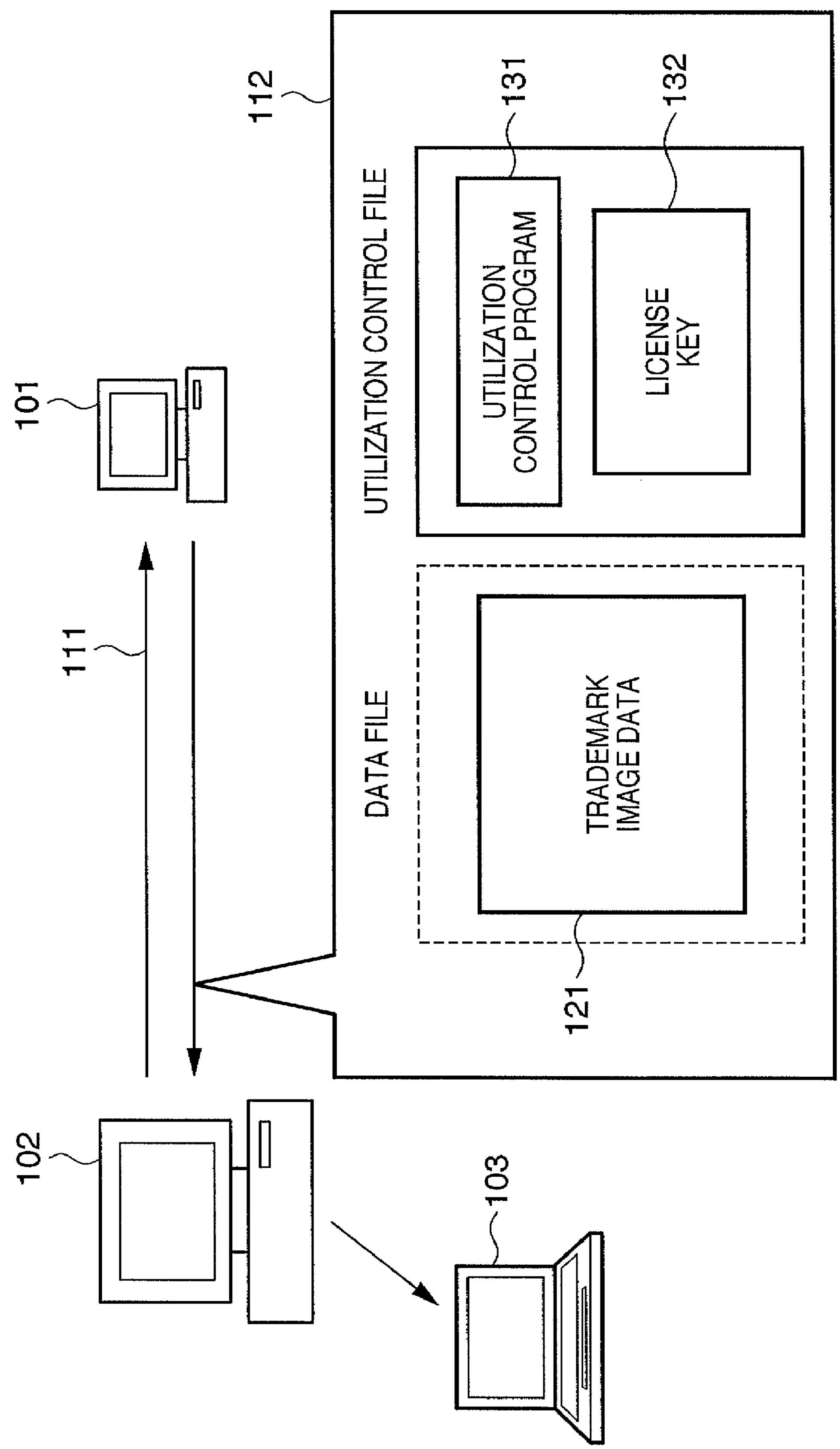
F I G. 1
101
102
103
111
112
UTILIZATION CONTROL FILE
131
UTILIZATION CONTROL PROGRAM
132
LICENSE KEY
DATA FILE
TRADEMARK IMAGE DATA
121

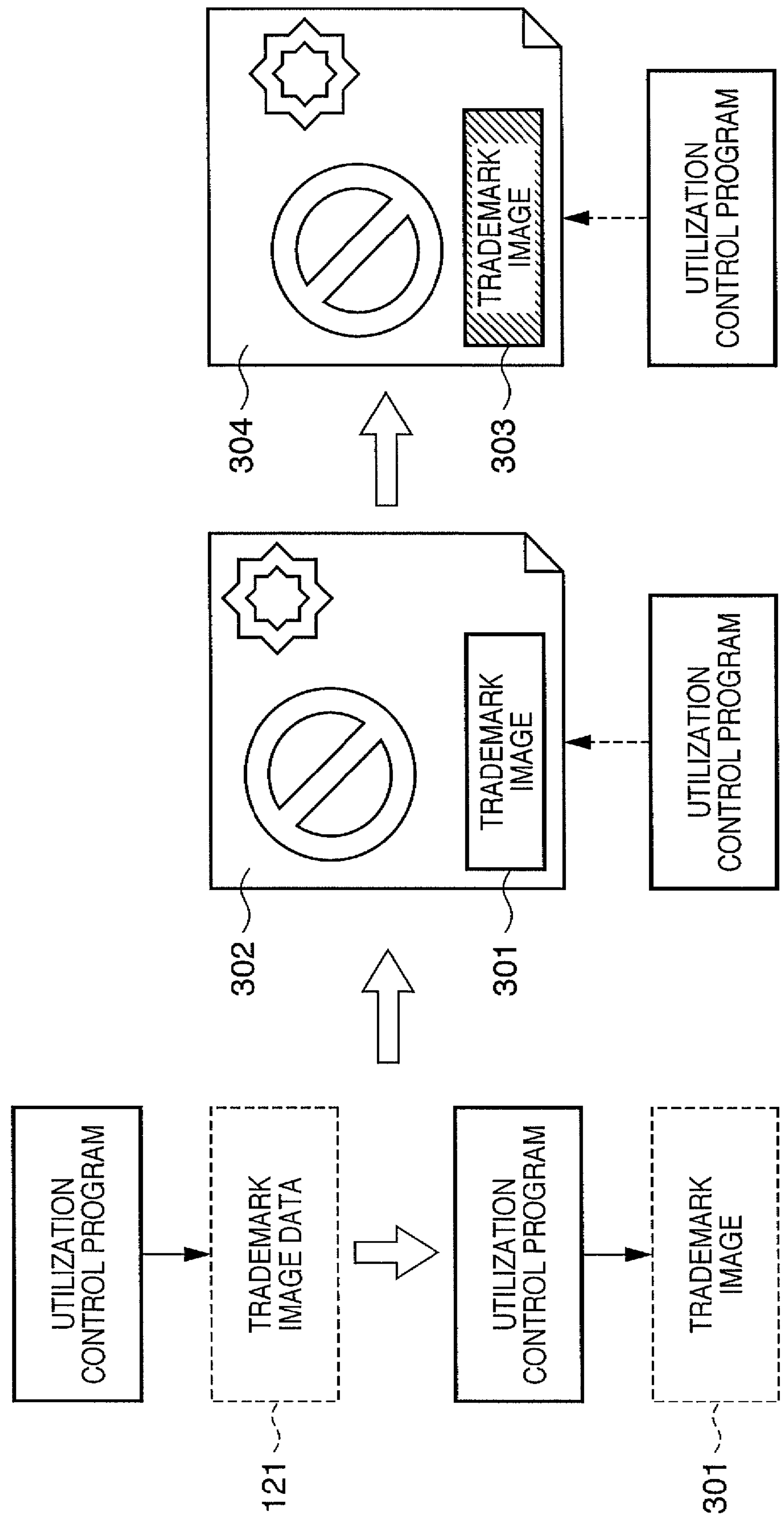
F I G. 3
UTILIZATION CONTROL PROGRAM
TRADEMARK IMAGE DATA
121
UTILIZATION CONTROL PROGRAM
TRADEMARK IMAGE
301
302
TRADEMARK IMAGE
301
UTILIZATION CONTROL PROGRAM
304
TRADEMARK IMAGE
303
UTILIZATION CONTROL PROGRAM

401

Higashi Ginga BeeR

402

TRADEMARK UTILIZATION POLICY
BACKGROUND COLOR SPECIFICATION :
COLOR DIFFERENCE ΔE : GREATER THAN OR EQUAL TO 1.2
HEIGHT/WIDTH RATIO CHANGE :
PROHIBITED

403

404

521
502
522
401
Higashi Ginga BeeR
523

F I G. 8
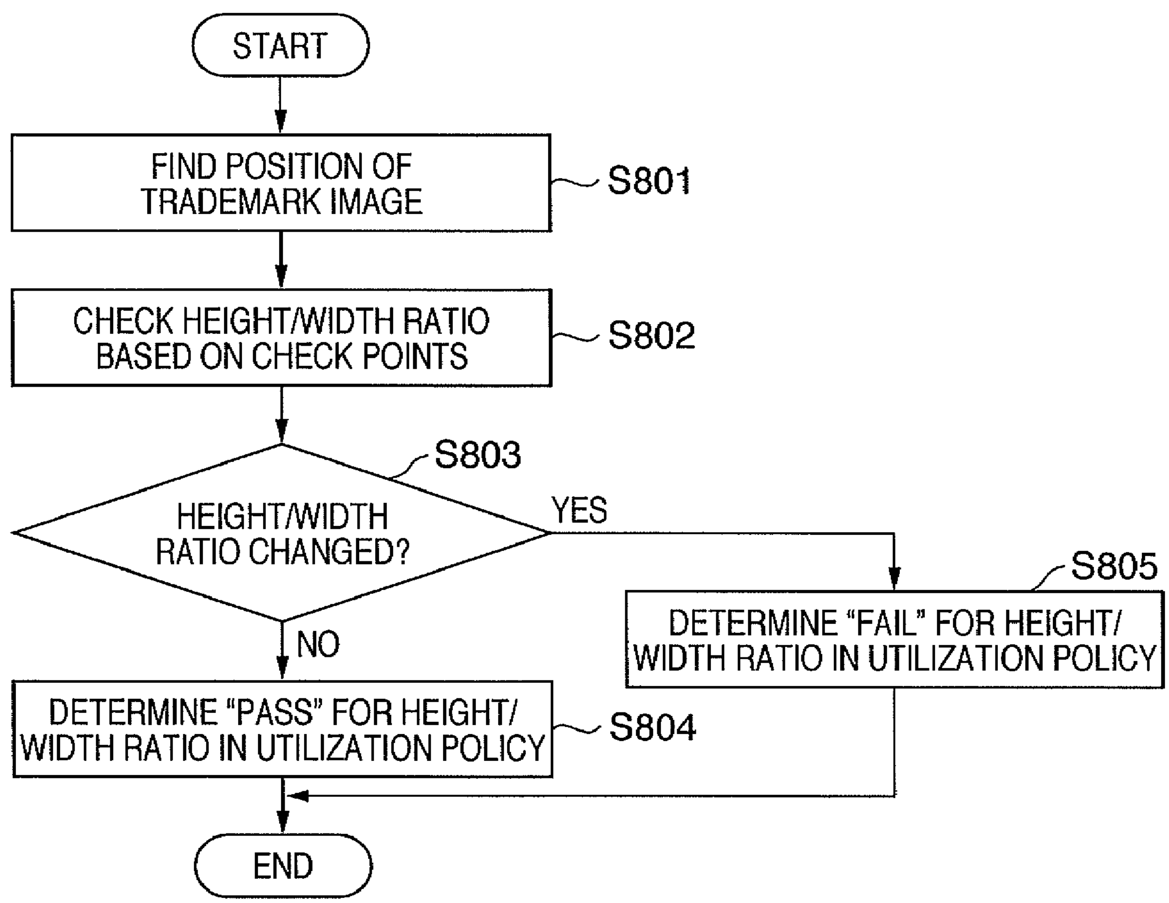

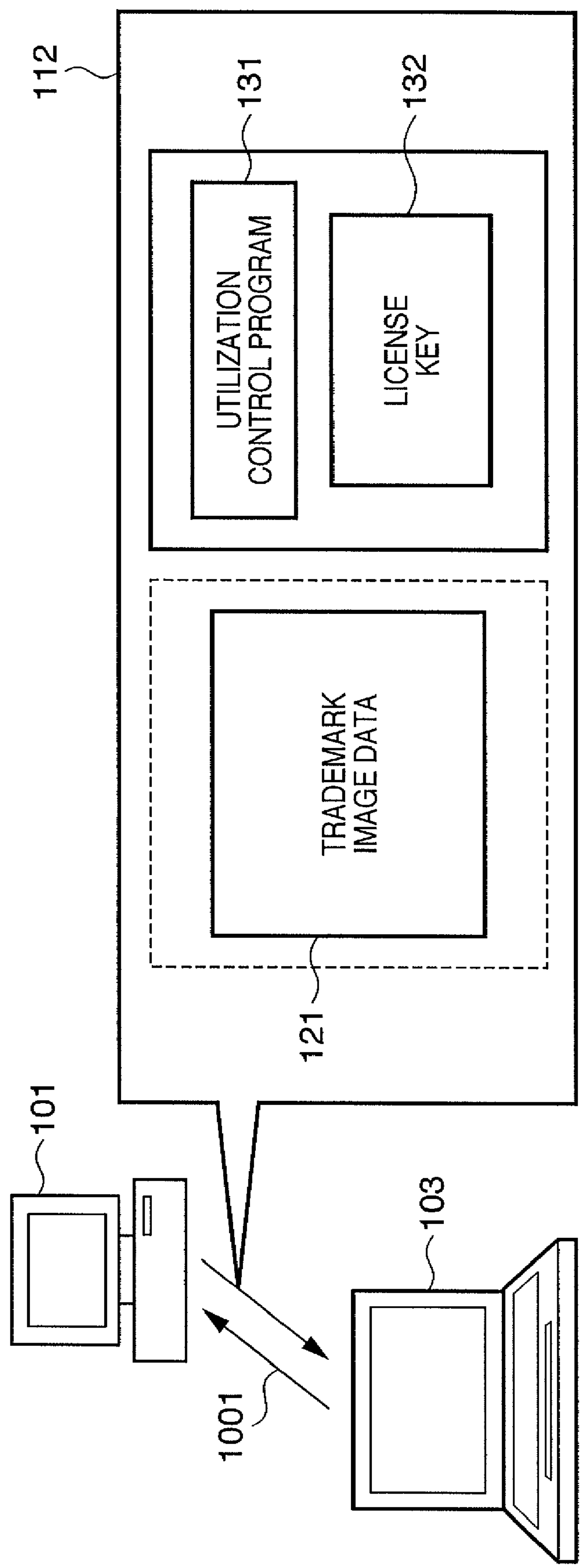
F I G. 10
112
131
UTILIZATION CONTROL PROGRAM
132
LICENSE KEY
TRADEMARK IMAGE DATA
121
101
103
1001

INFORMATION PROCESSING APPARATUS AND CONTROL METHOD THEREOF

BACKGROUND OF THE INVENTION

1. Field of the Invention

The present invention relates to an information processing apparatus that creates and stores an image that includes a specific image, and a control method thereof.

2. Description of the Related Art

Normally, when using trademark images such as industry logos, characters, and so on (in other words, corporate logos and the like), the background color of the image is specified in advance. For example, it has been determined that trademark images (corporate logos) that have an overall reddish color must have a white or light gray background, or they cannot be used. There are many cases where rules are in place concerning the use of such trademark images, particularly for corporate logos that place emphasis on clarity and design.

A conventional technology regarding "arrangements" in the utilization of copyright/trademark images has been proposed in Japanese Patent Laid-Open No. 2003-051932 (Patent Document 1). With this technology, an inspection server inspects whether or not a copyrighted image (for example, a picture) and a copyright mark (for example, "Copyright") are in a predetermined positional relationship. If the result of the inspection is negative, controls such as displaying a warning, prohibiting storage of the image, or terminating editing of the image are carried out.

However, there is currently no effective method for utilizations aside from the protection offered by Patent Document 1, from the standpoint of inspection/protection of parts relating to the color/shape of trademark images.

For this reason, it has thus far been necessary for a person to check whether or not the usage of a trademark image falls under predetermined utilization rules.

SUMMARY OF THE INVENTION

It is an object of the present invention to automatically determine whether or not a specific image, such as, for example, a trademark image, is being used under utilization rules.

One aspect of the present invention provides an information processing apparatus that receives a request to store a created image and stores the image for which the storage request was received, the apparatus comprises:

a ratio determination unit adapted to determine whether or not the height/width ratio of the image is changed by a user in a case where the request for storage of the image is received; and a control unit adapted to control the image to be stored or not to be stored based on the result of the determination made by the ratio determination unit.

Another aspect of the present invention provides an information processing apparatus that receives a request to store an image that includes a first image and a second image and stores the image that includes the first image and the second image for which the storage request was received, the apparatus comprises:

a determination unit adapted to determine the color of the first image and the color of the second image, in a case where the request for storage of the image that includes the first image and the second image is received; and a control unit adapted to control the image that includes the first image and the second image to be stored or not to be stored based on the difference in the color of the first image and the color of the second image determined by the determination unit.

Further features of the present invention will become apparent from the following description of exemplary embodiments (with reference to the attached drawings).

BRIEF DESCRIPTION OF THE DRAWINGS

FIG. 1 is a diagram illustrating an example of a configuration of a specific image processing system according to an embodiment of the present invention.

FIG. 3 is a flow diagram illustrating an outline of a utilization control program 131 according to an embodiment of the present invention.

FIG. 8 is a flowchart illustrating a process for determining whether or not a stipulation is complied with in regards to a change in a height/width ratio in the utilization policy.

FIG. 10 is a diagram illustrating an example of a configuration of a specific image processing system according to another embodiment of the present invention.

DESCRIPTION OF THE EMBODIMENTS

Figure 2:
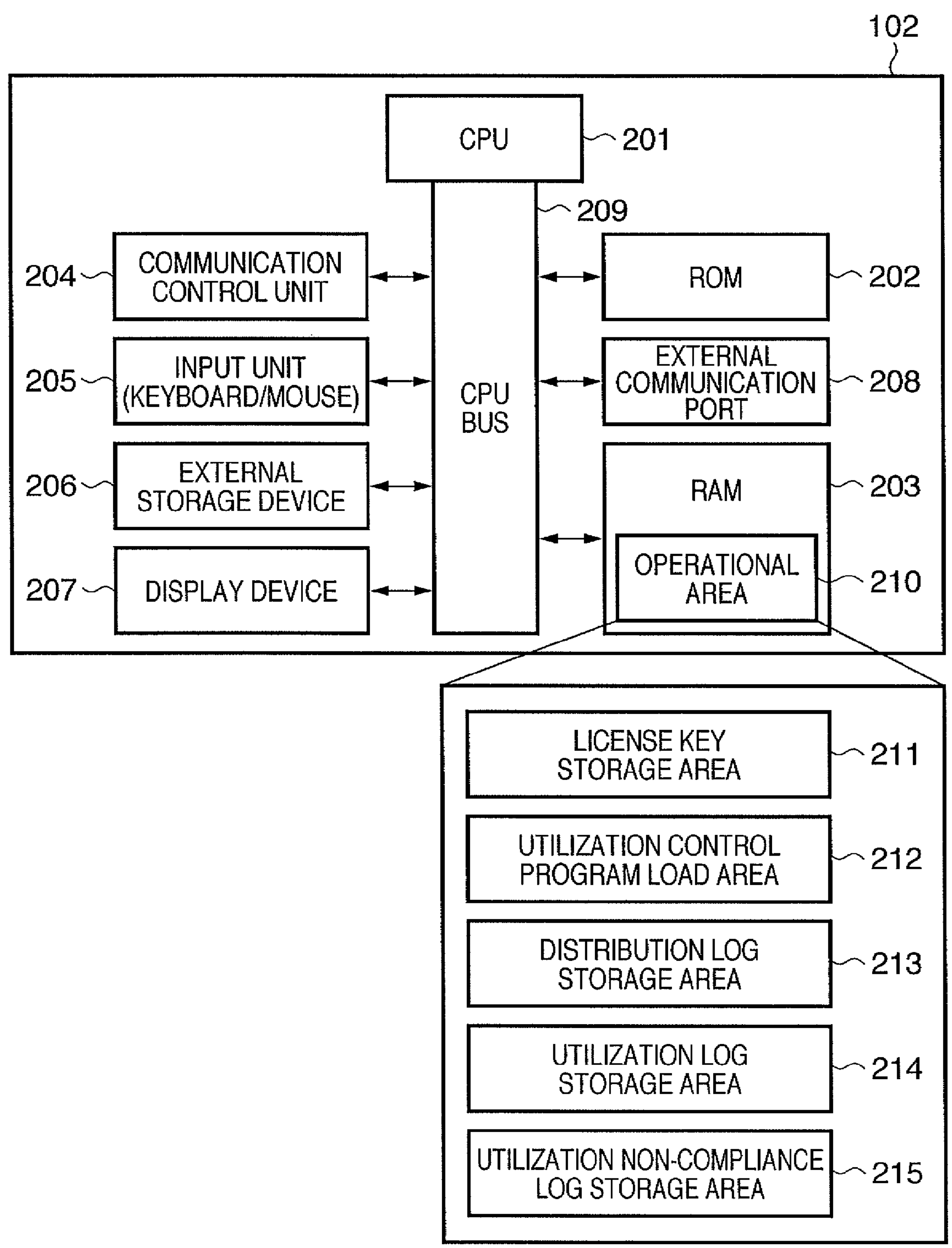
FIG. 2 is a block diagram illustrating an example of a configuration of a policy management server 102 shown in FIG. 1.

Preferred embodiments for carrying out the present invention shall be described in detail hereinafter with reference to the drawings.

FIG. 1 is a diagram illustrating an example of a configuration of a specific image processing system according to an embodiment of the present invention. In FIG. 1, 101 represents a personal computer (PC); upon receiving a usage license request 111 for a specific image such as a corporate logo (in other words, a trademark image), the PC 101 returns a license response 112. Here, this license response 112 includes the following: a data file containing trademark image data 121, in which the trademark image is encrypted; and a utilization control file made up of a utilization control program 131 for controlling the utilization of the trademark image and a license key 132 for licensing use to a user.

102 represents a policy management server, managing the trademark image data 121 in accordance with the utilization control program 131 sent from the PC 101. The policy management server 102 is an information processing apparatus that also functions as a document management server, security server, and so on, executing the utilization control program 131 when a user uses a trademark image, and decrypting the encrypted trademark image data 121. The license key 132 is used when executing this decryption.

103 represents a mobile PC, and is a local computer used by a user to create a desired image utilizing a trademark image managed by the policy management server 102.

Note that the PC 101, policy management server 102, and mobile PC 103 may be connected directly to one another, as shown in FIG. 1, or may be connected to one another via a network.

FIG. 2 is a block diagram illustrating an example of a configuration of the policy management server 102 shown in FIG. 1. In FIG. 2, 201 is a CPU, controlling the entire policy management server 102 in accordance with a program stored, for example, in a RON, mentioned next. 202 represents a ROM, in which a program for controlling the policy management server 102, control data, and so on are stored. 203 represents a RAM, including an operational area and various tables used when the CPU 201 executes processes.

210 represents the operational area within the RAM 203, and includes a license key storage area 211 in which the abovementioned license key 132 is stored, as well as a utilization control program load area 212 into which the utilization control program 131 is loaded. The operational area 210 further includes a distribution log storage area 213, a utilization log storage area 214, and a utilization non-compliance log storage area 215.

204 represents a communication control unit, controlling communication between the PC 101, mobile PC 103, and printers or the like (not shown). In the present embodiment, the communication control unit 204 is compliant with two-way communication. 205 represents an input unit, through which instructions are inputted to the policy management server 102 using a keyboard, a mouse, or the like. 206 represents an external storage device, which is a high-capacity hard disk or the like. 207 is a display device, which is a CRT display, an LCD display, or the like. 208 is an external communication port, which is an interface used for connecting to a network. The policy management server 102 communicates with the PC 101, mobile PC 103, a printer or the like (not shown), and so on through this network.

Next, a process whereby a user uses the mobile PC 103 to create a new image using a trademark image managed by the policy management server 102 shall be described with reference to FIG. 3. Note that this process is assumed to be executed by the CPU 201 in accordance with the utilization control program 131, which has been loaded into the utilization control program load area 212 of the policy management server 102. Furthermore, in the present embodiment, it is assumed that the user creates the new image using the trademark image through a screen supplied to the mobile PC 103 from the policy management server 102.

FIG. 3 is a flow diagram illustrating an outline of the utilization control program 131 according to the present embodiment. First, when the user requests startup of the utilization control program 131 supplied by the policy management server 102 using the mobile PC 103, the CPU 201 of the policy management server 102 executes the utilization control program 131. Next, in accordance with the utilization control program 131, the CPU 201 causes a screen prompting the user to input a license key to be displayed by the mobile PC 103. Then, if the user inputs a license key and that license key matches the license key 132 stored in the license key storage area 211 of the RAM 203, the CPU 201 decrypts the encrypted trademark image data 121.

Note that if the user fails to input a correct license key, the process may terminate without the trademark image data 121 being decrypted, or the display prompting the input of a license key may be displayed once again.

301 in FIG. 3 represents the decrypted trademark image, which the user can handle using the mobile PC 103. In accordance with the utilization control program 131, the trademark image 301, decrypted by the CPU 201, is caused to be displayed on the screen of the mobile PC 103, and the user creates an image using this trademark image 301. 302 in FIG. 3 represents the image created by the user using the trademark image 301.

Next, when the user requests the image 302 s/he created to be stored in or copied to the mobile PC 103, the CPU 201 determines a usage method of the trademark image 301, in accordance with the utilization control program 131. Specifically, this determination is made based on the following two points:

(1) whether the color difference between the color used for the trademark image and the color used for the background object is greater than or equal to a predetermined standard; and (2) whether the height/width ratio deviates from a predetermined standard of utilization.

Here, in the case where the CPU 201 makes a determination of "pass", an image 304, which includes a trademark image 303 determined to have "passed", is stored or copied. However, in the case where the CPU 201 makes a determination of "fail", the storage or copying is stopped, and a warning is provided to the user, the process of creating the image including the trademark image 301 is forcefully terminated, or the like.

Note that the processing performed in response to a determination of "fail" is assumed to be stipulated in advance by the utilization control program 131. When the image 304, for which the "pass" determination was made, is stored or copied, the CPU 201 encrypts that image 304. Thereafter, the CPU 201 prompts the user to input the license key even when displaying/editing the image 304 using the mobile PC 103.

Figure 4:
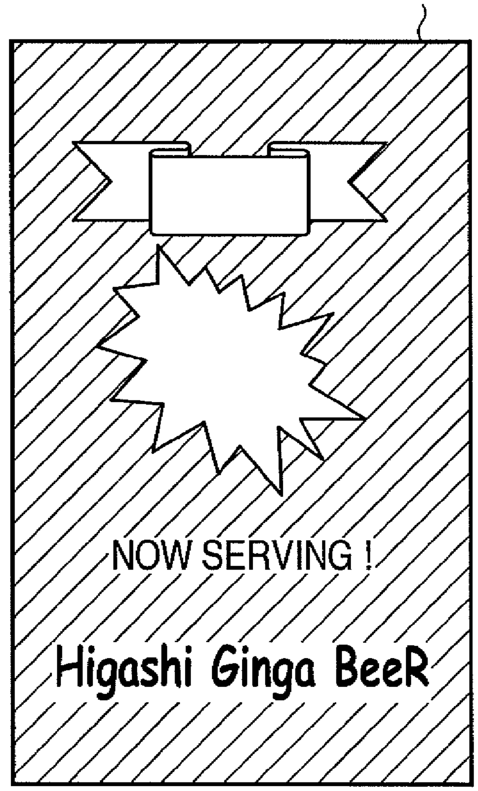
FIG. 4 is a diagram illustrating an example of a trademark image to which a utilization policy has been applied, according to an embodiment of the present invention.
Figure 4:
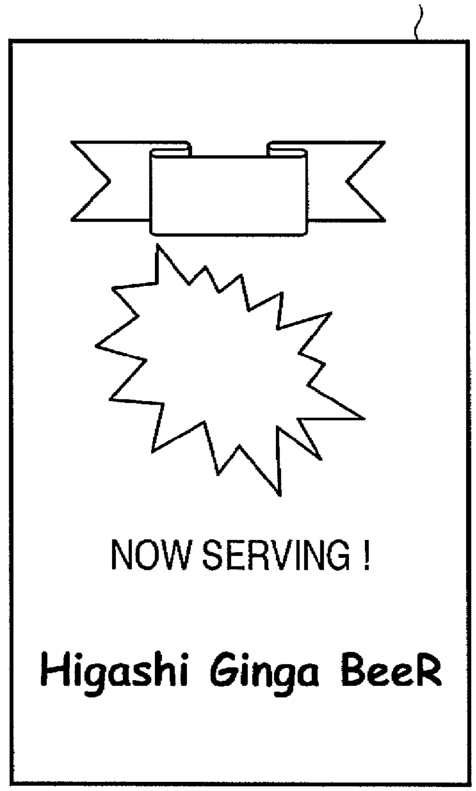

FIG. 4 is a diagram illustrating an example of a trademark image to which a utilization policy has been applied, according to the present embodiment. In FIG. 4, 401 represents the trademark image itself. 402 represents two standards stipulated as a trademark utilization policy in the present embodiment. First, "background color specification" specifies a color difference numerical value as a standard whereby the background color is of a level that does not interfere with the clarity of the trademark image when the trademark image is superimposed on the background. Next, "height/width ratio change" specifies whether or not the holder of the rights to the trademark image has authorized the height/width ratio to be changed.

403 represents an example in which the trademark image is arranged in the image created by the user using the mobile PC 103. In this example, the image is in conflict with the two standards set forth by the trademark utilization policy. First, with regard to the background color specification, the colors of the background and the trademark image resemble one another, and thus the image does not meet the color difference specification. There is, therefore, the danger that the background interferes with the clarity of the trademark image, causing the trademark image to be "buried" in the background. Moreover, the user has changed the height/width ratio of the trademark image, which has not been authorized by the holder of the rights to the trademark image.

As the image 403 is not compliant with the abovementioned trademark utilization policy, a response such as prohibiting copying of the image 403, providing a warning to the user, or the like is carried out.

404 represents an example of an image in which the user has re-created the image in response to the previous image not being compliant with the trademark utilization policy. In this example, there is a sufficient difference in the colors of the background and the trademark image, and furthermore, the height/width ratio of the trademark image has not been changed. In other words, "pass" is determined in response to a report that the image is compliant with the trademark image utilization policy, and storing/utilizing the image 404, which uses the trademark image 401, is allowed.

Figures 5A, 5B:
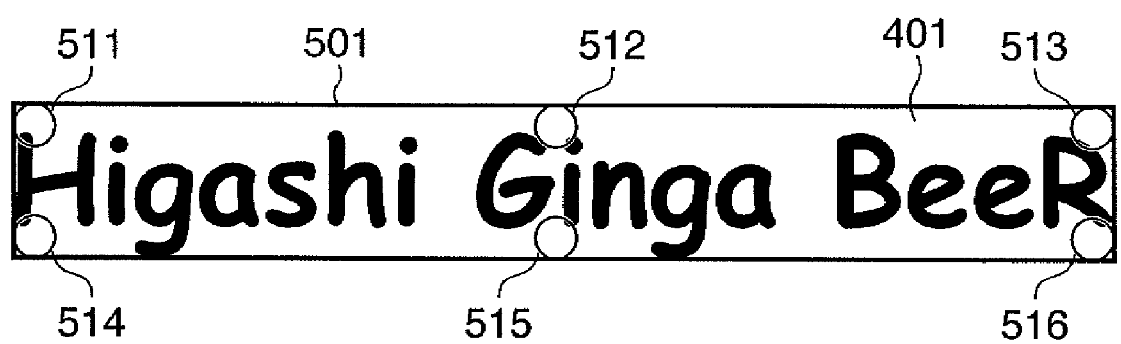
FIGS. 5A and 5B are diagrams illustrating an example of utilization policy determination points found in the trademark image 401 shown in FIG. 4.

FIGS. 5A and 5B are diagrams illustrating an example of utilization policy determination points found in the trademark image 401 shown in FIG. 4. The present invention controls the utilization of the trademark image; the standard on which the determination is based and the operations for the determination are made clear by stipulating which aspect of the trademark image control is to be based upon.

FIG. 5A is an example in which check points of the trademark image 401 are automatically extracted from the trademark image 401. First, a rectangle 501 is superimposed over the trademark image 401 so that at least one point in each of the top, bottom, left, and right directions makes contact with the rectangle 501. Next, the points at which the rectangle 501 and the trademark image 401 make contact with one another are confirmed as utilization policy determination points and registered. In this example, the check points are the points indicated by numbers 511 to 516.

Note that the confirmation and registration processes are assumed to be performed after the trademark image data 121 sent from the PC 101 is decrypted and before the image created by the user using the trademark image is stored or copied.

FIG. 5B is an example in which the check points of the trademark image 401 are set in advance at random. As opposed to the abovementioned FIG. 5A, here, the check points can be set as desired. In this example, the check points are the points indicated by numbers 521 to 523.

Note that the number of check points can be registered in advance, and it is also possible to register all the points automatically.

Furthermore, the color difference determination and height/width ratio determination is performed using these check points after the points have been set as shown in FIGS. 5A and 5B.

A procedure for a process of the utilization control program 131 executed by the CPU 201 of the policy management server 102 shall be described hereinafter with reference to FIGS. 6 to 10.

Figure 6:
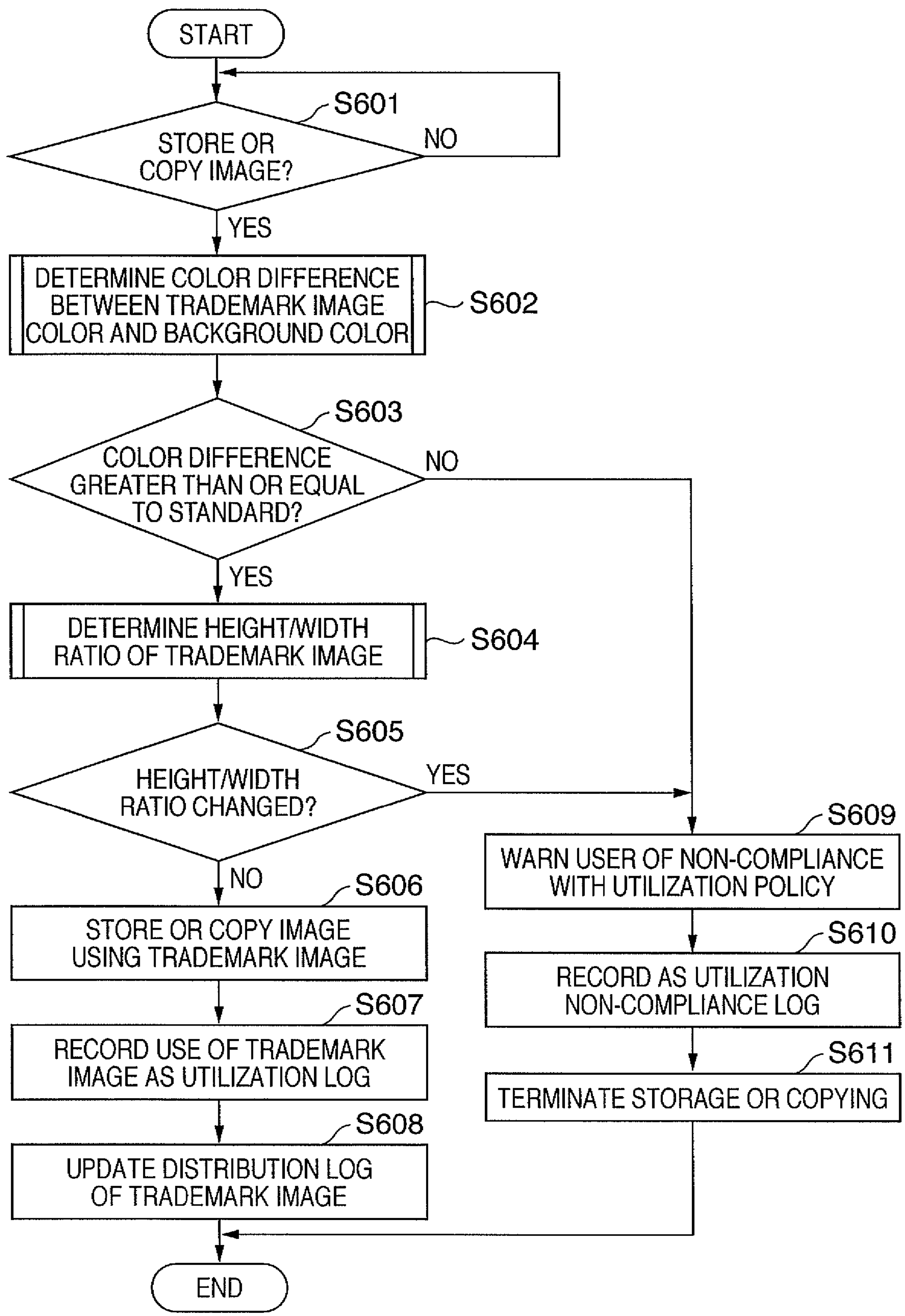
FIG. 6 is a flowchart illustrating a procedure for a process performed by the utilization control program 131 according to an embodiment of the present invention.

FIG. 6 is a flowchart illustrating a procedure for a process performed by the utilization control program 131 according to the present embodiment. First, in step S601, the CPU 201 waits for the user to request storage or copying of an image s/he created using a desired trademark image, the image being created using the mobile PC 103. After the storage or copying of the created image is requested, the process moves to step S602, where it is determined whether or not the trademark image in the image is compliant with the utilization policy 402 (whether the color difference specified by the background color specification is greater than or equal to the standard) shown in FIG. 4. Further details of this determination process shall be provided later with reference to FIG. 7.

Next, in step S603, if the color difference is found to be greater than or equal to the standard based on the result of the determination performed in step S602, or in other words, if "pass" is determined, the process moves to step S604. However, if the color difference is found not to meet the standard, or in other words, if "fail" is determined, the process moves to step S609.

In step S604, it is determined whether the trademark image included in the abovementioned image is compliant with the utilization policy 402 (whether the height/width ratio has been changed) shown in FIG. 4. Note that further details of this determination process shall be provided later with reference to FIG. 8. Furthermore, in the present embodiment, it is assumed that such a change is stipulated as "prohibited", as shown in FIG. 4.

Next, in step S605, if the height/width ratio is found not to have been changed based on the result of the determination performed in step S604, or in other words, if "pass" is determined, the process moves to step S606. However, if the height/width ratio is found to have been changed, or in other words, if "fail" is determined, the process moves to step S609.

In step S606, storage or copying of the image that uses the trademark image is authorized, and in step S607, the use of this trademark image is recorded as a utilization log into the utilization log storage area 214 of the RAM 203. Then, in step S608, the fact that this trademark image has been distributed to the user of the mobile PC 103 is recorded into the distribution log storage area 213, which stores a distribution log of the trademark image. After this, the process ends. Specifically, information that identifies the user, the address of the mobile PC 103, a date, and so on are recorded into the distribution log storage area 213.

Meanwhile, in step S609, a message stating that the trademark image used by the user is not in compliance with the utilization policy is sent to the mobile PC 103; this is communicated to the user as a warning. Next, in step S610, the fact that a trademark image not in compliance with the utilization policy has been used is recorded into the utilization non-compliance log storage area 215. Specifically, information that identifies the user, the address of the mobile PC 103, and so on are recorded into the utilization non-compliance log storage area 215. Finally, in step S611, the mobile PC 103 is instructed to perform a process for terminating the storage or copying. After this, the process ends.

It should be noted that although the example described in the present embodiment discusses a case where the image is stored in or copied to the mobile PC 103, the present invention is not intended to be limited to such a case. In other words, the image may be stored in or copied to the policy management server 102, another PC, or the like.

Figure 7:
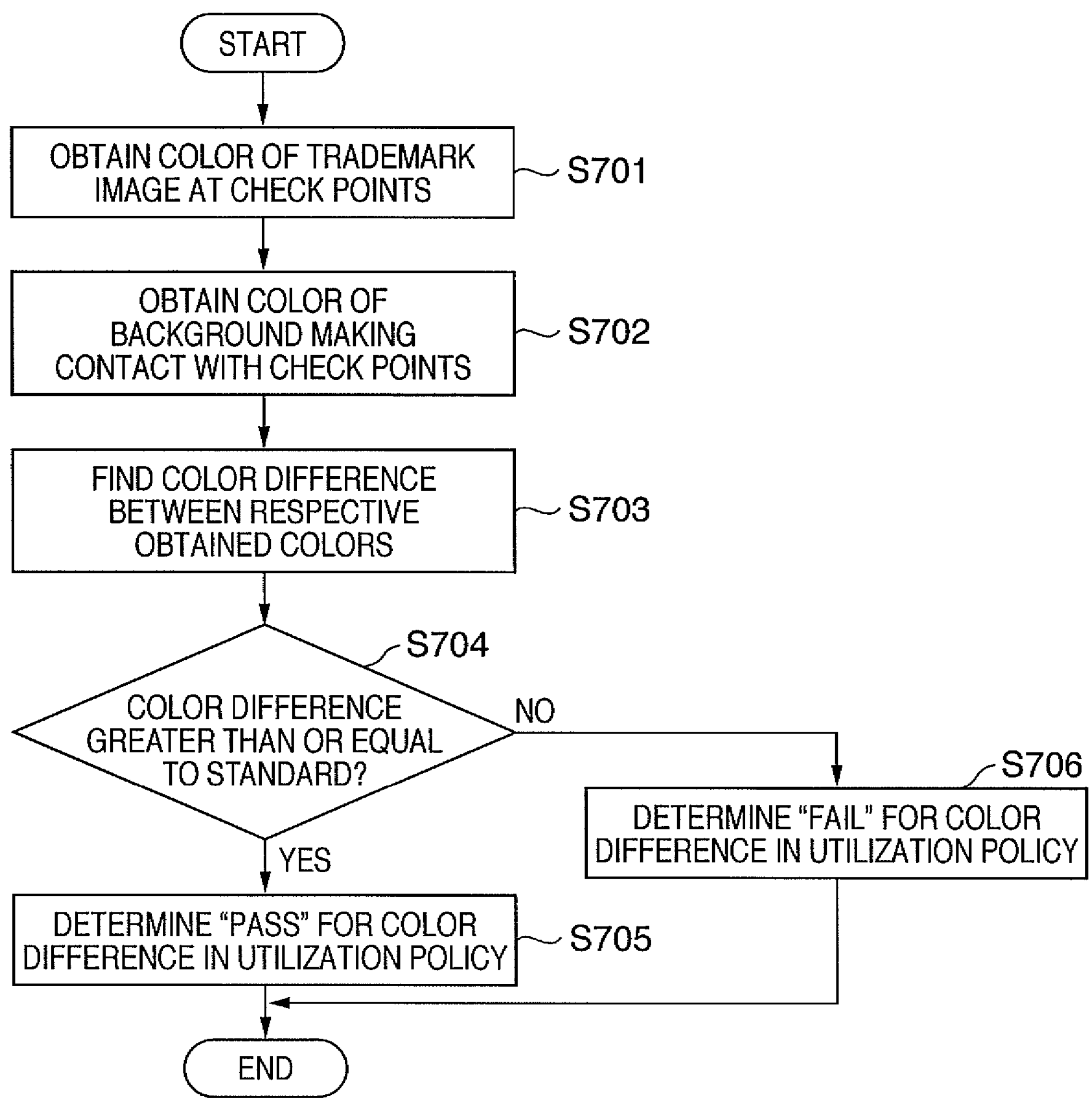
FIG. 7 is a flowchart illustrating a process for determining whether or not a stipulation is complied with in regards to a background color specification in the utilization policy.

Next, referring to FIG. 7, detailed descriptions shall be given regarding a process for determining whether or not a stipulation is complied with in regards to the background color specification in the utilization policy (S602 in FIG. 6), the process determining whether or not the color difference between the color of the trademark image and the color of the background is in compliance with the stipulation.

FIG. 7 is a flowchart illustrating the process for determining whether or not the stipulation is complied with in regards to the background color specification in the utilization policy. First, in step S701, the CPU 201 confirms the layout position of the trademark image included in the image created by the user, and obtains the color of the trademark image at the predetermined check points shown in FIGS. 5A and 5B. Next, in step S702, the CPU 201 confirms the type and position of other objects in the image created by the user, and obtains the color of the background object that makes contact with the check points shown in FIGS. 5A and 5B.

Next, in step S703, the colors obtained in steps S701 and S702 are compared, and a color difference is found thereby. The method for finding the color difference is not particularly specified here; any method may be used. Then, in step S704, it is determined whether the color difference is greater than or equal to a predetermined standard (1.2, in the examples shown in FIGS. 5A and 5B). Here, the process moves to step S705 in the case where the color difference is greater than or equal to the standard; the image is judged to have "passed" the determination of whether or not the stipulation is complied with in regards to the background color specification (color difference) of the utilization policy, and the process then ends. On the other hand, the process moves to step S706 in the case where the color difference does not meet the standard; the image is judged to have "failed" the determination of whether or not the stipulation is complied with in regards to the background color specification (color difference) of the utilization policy, and the process then ends.

Next, referring to FIG. 8, detailed descriptions shall be given regarding a process for determining whether or not a stipulation is complied with in regards to a change in a height/width ratio in the utilization policy (S604 in FIG. 6), the process determining whether or not the image is in compliance with the stipulation that prohibits a change in the height/width ratio of the trademark image.

FIG. 8 is a flowchart illustrating a process for determining whether or not a stipulation is complied with in regards to a change in a height/width ratio in the utilization policy. First, in step S801, the CPU 201 finds the layout position and angles of the trademark image included in the image created by the user. Next, in step S802, the CPU 201 checks the height/width ratio of the trademark image based on the predetermined check points shown in FIGS. 5A and 5B. Specifically, the trademark image in which the check points have been determined is superimposed onto this trademark image and enlarged/reduced in the lower-right direction using the check point located on the upper left as the starting point. The height/width ratio is checked based on whether or not all the check points overlap one another.

Next, in step S803, changing the height/width ratio is stipulated as being "prohibited"; therefore, the process moves to step S804 in the case where all the check points match in step S802, whereas the process moves to step S805 in the case where all the check points do not match in step S802.

In step S804, the image is determined to have "passed" the determination of whether or not the stipulation is complied with in regards to a change in the height/width ratio in the utilization policy, and the process ends. However, in step S805, the image is determined to have "failed" the determination of whether or not the stipulation is complied with in regards to a change in the height/width ratio in the utilization policy, and the process ends.

Next, a process for encrypting the trademark image when executing a process for saving an image that uses the trademark image shall be described with reference to FIG. 9.

Figure 9:
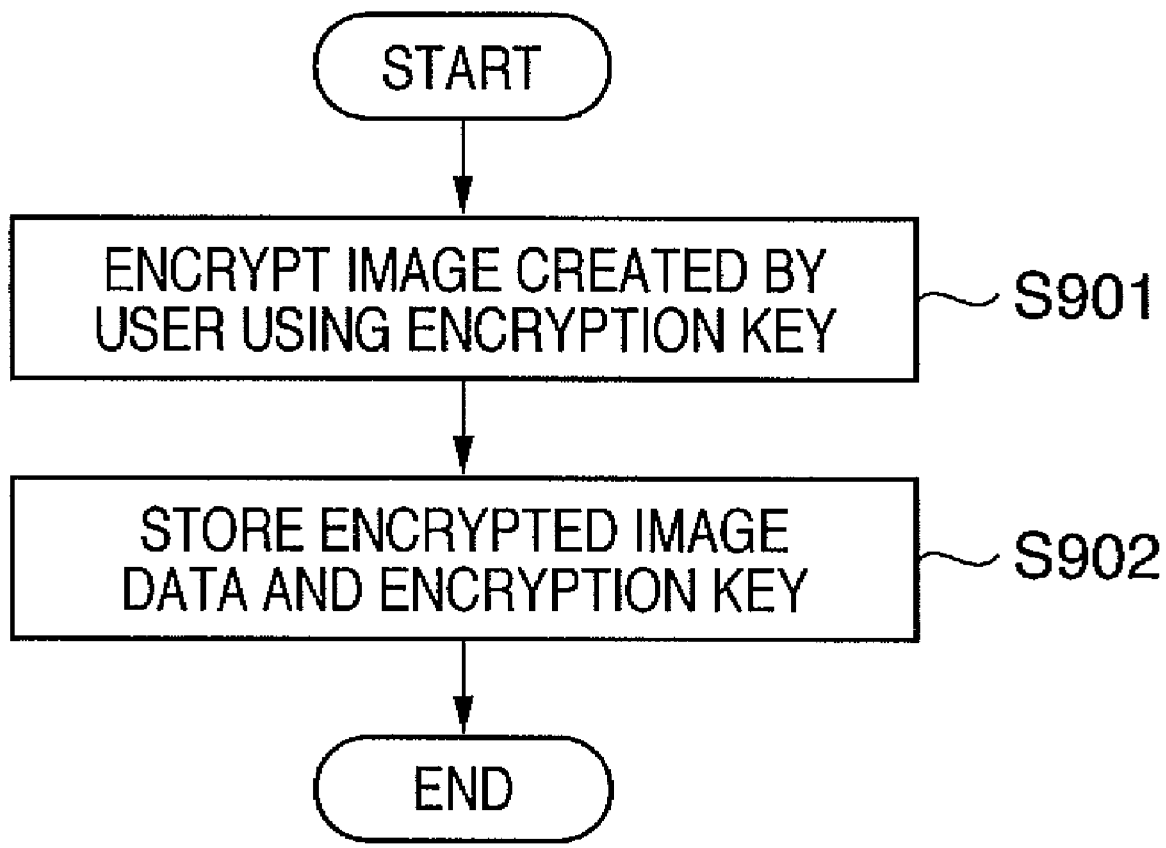
FIG. 9 is a flowchart illustrating a process performed in the case where a trademark image is encrypted and stored.

FIG. 9 is a flowchart illustrating a process performed in the case where a trademark image is encrypted and stored. First, in step S901, the image created by the user using the trademark image is encrypted. This encryption may be carried out using the license key, or may be carried out using another encryption key. Next, in step S902, the encrypted image data is stored along with the encryption key.

Note that it is necessary for the user to decrypt the encrypted image data using the stored encryption key in order to edit the encrypted image data.

Other Embodiments

Next, another embodiment according to the present invention shall be described in detail with reference to the drawings. In the above embodiment and variations thereof, a policy management server 102 is provided, and the CPU 201 of the policy management server 102 executes a utilization control program. However, in another embodiment, the utilization control program is downloaded to the mobile PC 103 and executed there.

FIG. 10 is a diagram illustrating an example of a configuration of a specific image processing system according to this other embodiment of the present invention. Note that elements identical to those in the configuration shown in FIG. 1 and described in the above embodiment shall be given identical reference numbers, and descriptions thereof shall be omitted.

As shown in FIG. 10, when a PC 101 receives a usage license request 1001 for a trademark image managed by the PC 101, it returns a license response 112. This license response 112 includes trademark image data 121 in which the trademark image is encrypted, a utilization control program 131, and a license key 132, in the same manner as the abovementioned embodiment.

Then, in the mobile PC 103, the utilization control program 131 included in the license response 112 is loaded into an area in a RAM, and the CPU of the mobile PC 103 performs processes in accordance with the loaded utilization control program. These processes are the same as the processes performed by the policy management server 102 as described in the abovementioned embodiment, and thus descriptions thereof shall be omitted.

It should be noted that although the color difference and height/width ratio are listed as examples for use in controlling the utilization of trademark images, should new requirements for trademark protection arise in the future, a trademark image utilization policy that corresponds to these new requirements may be loaded and control performed based thereupon.

According to the embodiments as described thus far, the intents (limits) for utilization of a trademark image can be protected automatically. Moreover, it is possible to prevent the trademark image from being buried in the background as a result of the usage method, as well as prevent unauthorized changes in the design. Furthermore, the trademark image itself is encrypted, which makes it possible to prevent unauthorized redistribution of the trademark image.

According to the present invention, it is possible to automatically determine whether or not a specific image, such as, for example, a trademark image, is being used under utilization rules.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a recording medium in which the program code for software that realizes the functions of the aforementioned embodiment has been stored, and causing a computer (CPU or MPU) of the system or apparatus to read out and execute the program code stored in the recording medium.

In such a case, the program code read out from the recording medium realizes the functionality of the aforementioned embodiment, and the present invention is configured of the recording medium in which the program code is stored.

Examples of a recording medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the case in which the program code read out from the recording medium is written into a memory included in an expansion board inserted into the computer, an expansion unit connected to the computer, or the like, a CPU or the like included in the expansion board or expansion unit then performs all or part of the actual processing based on instructions included in the program code, and the functions of the aforementioned embodiment are implemented through that processing, is also included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336378, filed Dec. 13, 2006, which is hereby incorporated by reference herein in its entirety.

What is claimed is:

1. An information processing apparatus that receives a request to store a created image including a specific image and stores the image including the specific image for which the storage request was received, the apparatus comprising:

color difference determination unit that determines whether or not the color difference between the color of the specific image and the color of the background of the specific image is greater than or equal to a predetermined standard in a case where the request for storage of the image including the specific image is received; and control unit that controls the image including the specific image to be stored or not to be stored based on the result of the determination made by said color difference determination unit, wherein said control unit controls the image to be stored in a case where it is determined that the color difference is greater than or equal to the predetermined standard, and controls the image not to be stored in a case where it is determined that the color difference is less than the predetermined standard.

2. The apparatus according to claim 1, wherein when storing the image including the specific image, said control unit encrypts the image using an encryption key, and stores the encryption key and the encrypted image data.

3. A method for controlling an information processing apparatus that receives a request to store a created image including a specific image and stores the image including the specific image for which the storage request was received, the method comprising:

a color difference determination step that color difference determination unit determines whether or not the color difference between the color of the specific image and the color of the background of the specific image is greater than or equal to a predetermined standard in a case where the request for storage of the image including the specific image is received; and a control step that control unit controls the image including the specific image to be stored or not to be stored based on the result of the determination made in the color difference determination step, wherein, in the control step, the image to be stored is controlled in a case where it is determined that the color difference is greater than or equal to the predetermined standard, and the image not to be stored is controlled in a case where it is determined that the color difference is less than the predetermined standard.

4. A program on a computer-readable recording medium for causing a computer to execute the method of controlling an information processing apparatus set forth in claim 3.

* * * * *